United States Patent [19] [11] Patent Number: 6,060,133
Lacey et al. [45] Date of Patent: *May 9, 2000

[54] POLYSILOXANES

[75] Inventors: David Lacey; Timothy Earl Mann; Julie Ann Haley, all of Hull; Damien Gerard McDonnell, Malvern, all of United Kingdom

[73] Assignee: The Secretary of State for Defence in Her Britannic Majesty's Government of the United Kingdom of Great Britain and Northern Ireland, United Kingdom

[*] Notice: This patent issued on a continued prosecution application filed under 37 CFR 1.53(d), and is subject to the twenty year patent term provisions of 35 U.S.C. 154(a)(2).

[21] Appl. No.: 08/930,643

[22] PCT Filed: Apr. 4, 1996

[86] PCT No.: PCT/GB96/00837

§ 371 Date: Oct. 6, 1997

§ 102(e) Date: Oct. 6, 1997

[87] PCT Pub. No.: WO96/31576

PCT Pub. Date: Oct. 10, 1996

[30] Foreign Application Priority Data

Apr. 7, 1995 [GB] United Kingdom ............ 9507316

[51] Int. Cl.[7] .................... C09K 19/34; C09K 19/36; C09K 19/40; C08G 77/04
[52] U.S. Cl. .................. 428/1; 252/299.61; 526/10
[58] Field of Search ............... 252/299.61, 299.66, 252/299.67, 299.64, 299.65; 526/25, 26, 10; 428/1

[56] References Cited

U.S. PATENT DOCUMENTS

| | | | |
|---|---|---|---|
| 5,138,010 | 8/1992 | Keller et al. | 528/26 |
| 5,304,667 | 4/1994 | Haeberle et al. | 556/413 |
| 5,610,258 | 3/1997 | Weitzel et al. | 528/25 |
| 5,688,436 | 11/1997 | Ohnishi et al. | 252/299.01 |

FOREIGN PATENT DOCUMENTS

| | | |
|---|---|---|
| 0 466 183 | 1/1992 | European Pat. Off. . |
| 0 488 825 | 6/1992 | European Pat. Off. . |
| 617111 | 9/1994 | European Pat. Off. . |
| 0 704 514 | 4/1996 | European Pat. Off. . |

*Primary Examiner*—Shean C. Wu
*Attorney, Agent, or Firm*—Nixon & Vanderhye

[57] ABSTRACT

A compound of formula I

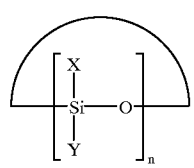

wherein n=3–30; X and Y are independently chosen from $C_{1-6}$ alkyl, phenyl or formula II:

$(CH_2)_pO—M$     II wherein p=1–20 and M is a group of formula III:

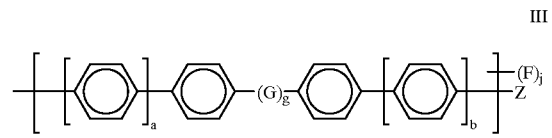

wherein a, b and g are independently chosen from 0 and 1; G is selected from $CO_2$, OCO and is a single bond when g=0; j=0–4; F indicates that one or more of the phenyl rings may be laterally fluorinated; Z is chosen from R, OR, $CO_2R$, OCOR or CN wherein R is selected from chiral $C_{4-20}$ branched chain alkyl, provided that at least one of X and Y is selected from formula II and that the positions of X and Y relative to each other provide stereo-isomers.

17 Claims, 10 Drawing Sheets

2a, 3a : R = -CH₂C*H(CH₃)C₂H₅

2b, 3b : R = -C*H(CH₃)C₆H₁₃

9a, 10a : R = -CH₂C*H(CH₃)C₂H₅

9b, 10b : R = -C*H(CH₃)C₆H₁₃

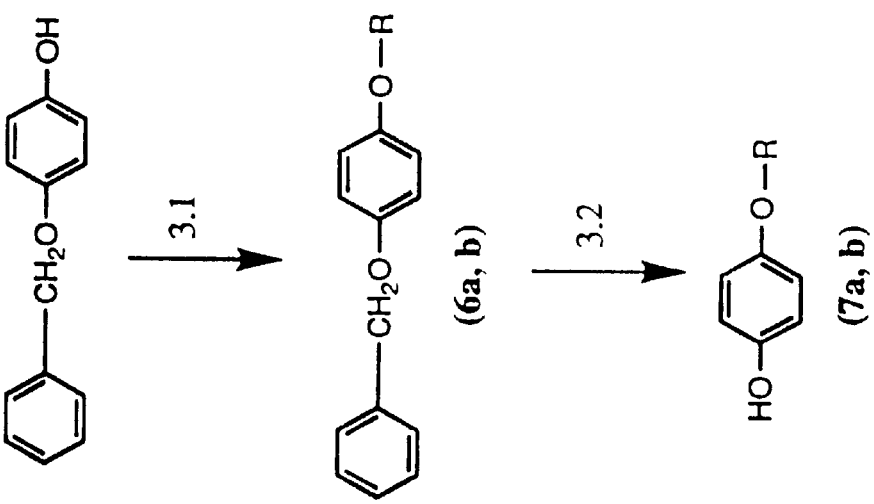
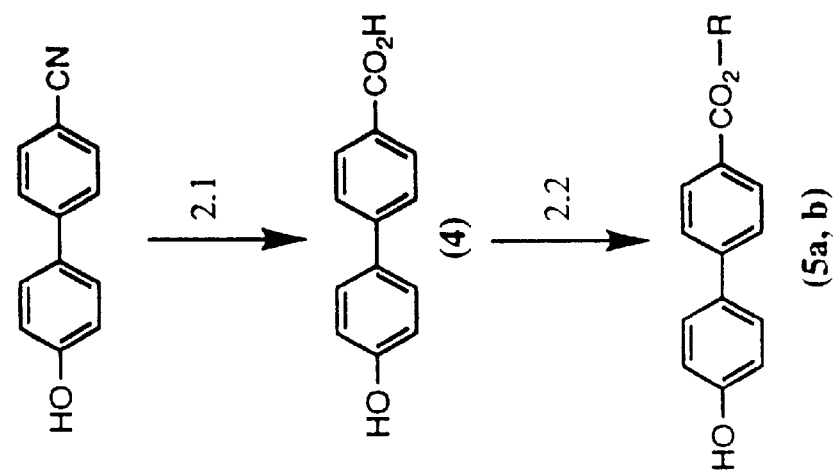

Fig.9.
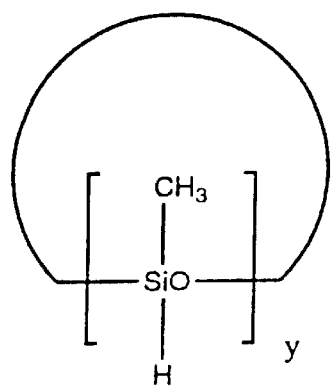
9.1
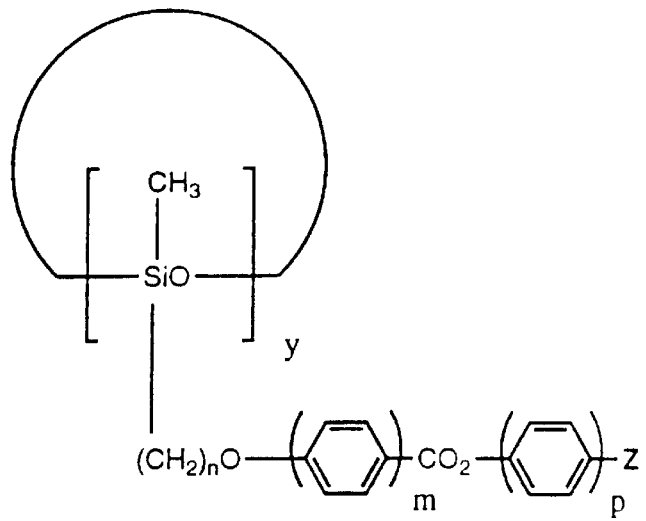
35-98
$y = 4$ or $5$, $n = 6$ or $11$, $m = 1$ or $2$, $p = 1$ or $2$
$Z = -CO_2CH_2\overset{*}{C}H(CH_3)C_2H_5$ or $-OCH_2\overset{*}{C}H(CH_3)C_2H_5$ or
$-CO_2\overset{*}{C}H(CH_3)C_6H_{13}$ or $-O\overset{*}{C}H(CH_3)C_6H_{13}$

POLYSILOXANES

This application is a 371 PCT/GB96/00837 filed Apr. 4, 1996.

This invention relates to liquid crystal polysiloxanes suitable for use in liquid crystal mixtures and their inclusion in liquid crystal devices.

BACKGROUND OF THE INVENTION

Liquid crystals can exist in various phases. In essence there are three different classes of liquid crystalline material, each possessing a characteristic molecular arrangement. These classes are nematic, cholesteric, (chiral nematic) and smectic. A wide range of smectic phases exists, for example smectic A and smectic C. Some liquid crystal materials possess a number of liquid crystal phases on varying the temperature, others have just one phase. For example, a liquid crystal material may show the following phases on being cooled from the isotropic phase: isotropic-nematic-smectic A-smectic C-solid. If a material is described as being smectic A then it means that the material possesses a smectic A phase over a useful working temperature range.

Ferroelectric smectic liquid crystal materials, which can be produced by mixing an achiral host and a chiral dopant, use the ferroelectric properties of the tilted chiral smectic C, F, G, H, I, J and K phases. The chiral smectic C phase is denoted $S_C^*$ with the asterisk denoting chirality. The $S_C$ phase is generally considered to be the most useful as it is the least viscous. Ferroelectric smectic liquid crystal materials should ideally possess the following characteristics: low viscosity, controllable spontaneous polarisation (Ps) and an $S_C$ phase that persists over a broad temperature range, which should include ambient temperature and exhibits chemical and photochemical stability. Materials which possess these characteristics offer the prospect of very fast switching liquid crystal containing devices. Some applications of ferroelectric liquid crystals are described by J. S. Patel and J. W. Goodby in Opt. Eng., 1987, 26, 273.

In ferroelectric liquid crystal devices the molecules switch between different alignment directions depending on the polarity of an applied electric field. These devices can be arranged to exhibit bistability where the molecules tend to remain in one of two states until switched to the other switched state. Such devices are termed surface stabilised ferroelectric devices, eg as described in U.S. Pat. No. 5,061,047 and U.S. Pat. No. 4,367,924 and U.S. Pat. No. 4,563,059. This bistability allows the multiplex addressing of quite large and complex devices.

It is well known in the field of ferroelectric liquid crystal device technology that in order to achieve the highest performance from devices, it is important to use mixtures of compounds which give materials possessing the most suitable ferroelectric smectic characteristics for particular types of device. The thermal and physical properties of the device mixture may be finely tuned by adjusting the concentrations and nature of the components in the mixture.

Cholesteric or chiral nematic liquid crystals possess a twisted helical structure which is capable of responding to a temperature change through a change in the helical pitch length. Therefore as the temperature is changed then the wavelength of the light reflected from the planar cholesteric structure will change and if the reflected light covers the visible range then distinct changes in colour occur as the temperature varies. This means that there are many possible applications including the areas of thermography and thermooptics.

The cholesteric mesophase differs from the nematic phase in that in the cholesteric phase the director is not constant in space but undergoes a helical distortion. The pitchlength for the helix is a measure of the distance for the director to turn through 360°.

By definition a cholesteric material is a material which contains a chiral centre. Cholesteric materials may also be used in electrooptical displays as dopants, for example in twisted nematic displays where they may be used to remove reverse twist defects. They may also be used in cholesteric to nematic dyed phase change displays where they may be used to enhance contrast by preventing wave-guiding.

Thermochromic applications of cholesteric liquid crystal materials usually use thin-film preparations of the cholesterogen which are then viewed against a black background. These temperature sensing devices may be placed into a number of applications involving thermometry, medical thermography, non-destructive testing, radiation sensing and for decorative purposes. Examples of these may be found in D. G. McDonnell in Thermotropic Liquid Crystals, Critical Reports on Applied Chemistry, Vol. 22, edited by G. W. Gray, 1987 pp 120–44; this reference also contains a general description of thermochromic cholesteric liquid crystals.

Generally, commercial thermochromic applications require the formulation of mixtures which possess low melting points, short pitch lengths and smectic transitions just below the required temperature-sensing region. Preferably the mixture or material should retain a low melting point and high smectic-cholesteric transition temperatures.

In general, thermochromic liquid crystal devices have a thin film of cholesterogen sandwiched between a transparent supporting substrate and a black absorbing layer. One of the fabrication methods involves producing an 'ink' with the liquid crystal by encapsulating it in a polymer and using printing technologies to apply it to the supporting substrate. Methods of manufacturing the inks include gelatin microencapsulation. U.S. Pat. No. 3,585,318 and polymer dispersion, U.S. Pat. Nos. 1,161,039 and 3,872,050. One of the ways for preparing well-aligned thin-film structures of cholesteric liquid crystals involves laminating the liquid crystal between two embossed plastic sheets. This technique is described in UK patent 2,143,323.

One class of liquid crystal materials are known as polymer liquid crystals.

The unit that is the basic building block of a polymer is called a monomer.

In liquid crystal polymers the monomers can be attached together in essentially two ways. The liquid crystal part or mesogenic unit of the polymer may be part of the polymer backbone resulting in a main chain liquid crystal (MCLC) polymer. Alternatively, the mesogenic unit may be attached to the polymer backbone as a pendant group i.e. extending away from the polymer backbone; this results in a side chain liquid crystal (SCLC) polymer. These different types of polymer liquid crystal are represented schematically below. The mesogenic units are depicted by the rectangles.

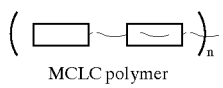

MCLC polymer

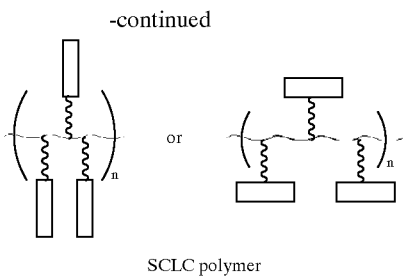

SCLC polymer

The side chain liquid crystal polymer can generally be thought of as containing a polymer backbone with rigid segments (the mesogenic unit) attached along its length by a flexible.(or rigid) unit as depicted in the schematic representation on the following page. It is the anisotropic, rigid section of the mesogenic units that display orientational order in the liquid crystal phases. In order to affect the phases exhibited by the liquid crystal and the subsequent optical properties there are many features which can be altered, some of these features are particularly pertinent to side chain liquid crystal polymers. One of these features is the flexible part that joins the mesogenic unit to the polymer backbone which is generally referred to as a spacer group; the length and flexibility of this spacer group can be altered.

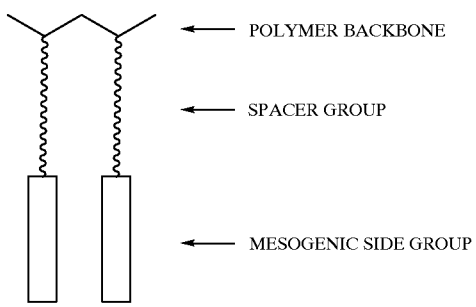

A number of side chain liquid crystal polymers are known, for example see GB 2146787 A.

Liquid crystal polyacrylates are a known class of liquid crystal polymer (LCP). LCPs are known and used in electro-optic applications, for example in pyroelectric devices, non-linear optical devices and optical storage devices. For example see GB 2146787 and Makromol. Chem. (1985) 186 2639–47.

Side chain liquid crystal polyacrylates are described in Polymer Communications (1988), 24, 364–365 e.g. of formula:

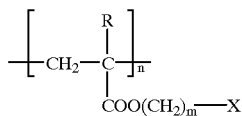

where $(CH_2)_m$—X is the side chain mesogenic unit and R is hydrogen or alkyl.

Side chain liquid crystal polychloroacrylates are described in Makromol. Chem. Rapid Commun. (1984), 5, 393–398 e.g. of formula:

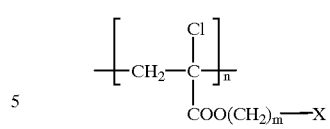

A method for the preparation of homo- or co-polyacrylates having the following repeat unit is described in UK patent application GB 9203730.8

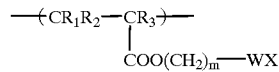

$R_1$ and $R_2$ are independently alkyl or hydrogen. $R_3$ is alkyl, hydrogen or chlorine, m is 0 or an integer 1–20, W is a linkage group COO or OOC, O and X is a mesogenic group.

The technique for aligning low molar mass liquid crystals is typically as follows. Transparent electrodes are fabricated on the surfaces of the substrates, the substrates typically being made of glass eg glass slides. In twisted nematic or super twisted nematic devices, for example, an alignment process is necessary for both substrates. A thin alignment layer is deposited to align the liquid crystal molecules, typically either organic or inorganic aligning layers are used, for example SiO deposited by evaporation is a typical inorganic alignment layer. One method to form the alignment layer involves rubbing the surface by textures or cloths. Polyimides have also been employed for the surface alignment of layers. Polyimide is coated onto the substrates bearing electrodes by a spinner and then cured to form a layer of approximately 50 nm thickness. Then each layer surface is repeatedly rubbed in substantially one direction with an appropriate material. If the liquid crystal molecules are deposited on this layer they are automatically aligned in the direction made by the rubbing. It is often preferable if the molecules possess a small angle pre-tilt typically 2–3°. Higher pre-tilts are sometimes required.

The two substrates are then fixed together for example by adhesive and are kept separated by spacing materials. This results in uniform and accurate cell spacing. A typical adhesive is an epoxy resin. This sealing material is usually then precured. The electrodes may then be precisely aligned for example to form display pixels. The cell is then cured at, for example 100–150° C. At this point the empty liquid crystal cell is complete.

It is at this point that the cell is filled with liquid crystal material. The opening size in the sealing area of the liquid crystal cell is rather small therefore the cell can be evacuated, for example in a vacuum chamber, and the liquid crystal forced into the cell via gas pressure. More than one hole in the sealing area may be used. The empty cell is put into a vacuum chamber and then the vacuum chamber is pumped down. After the cell has been evacuated the open region of the sealant is dipped into the liquid crystal material and the vacuum chamber is brought back to normal pressure. Liquid crystal material is drawn into the cell as a result of capillary action, external gases can be applied to increase the pressure. When the filling process is complete the hole or holes in the sealant is/are capped and the cell is cured at a temperature above the liquid crystal material clearing point to make the liquid crystal molecular alignment stable and harden the capping material.

Polymer liquid crystal molecules tend to be more viscous than low molecular weight liquid crystal materials and are therefore more difficult to align and more difficult to fill into devices. Only liquid crystal polymers with low molecular weights can be flow filled into a cell, and once a degree of polymerisation greater than around 30 or 40 repeat units is reached, most liquid crystal polymers become so viscous that flow filling cells is extremely difficult. Much slower cooling is needed in order to try and align liquid crystal polymers and this usually results in poor uniformity of alignment.

Poorly aligned liquid crystal molecules do not result in the fast switching high contrast devices that are generally required.

The above techniques are suitable for many liquid crystal materials including those devices which use liquid crystal materials which exhibit and utilise the smectic mesophase, eg ferroelectrics. Suitable alignment techniques may also be found in GB 2210469 B.

Ferroelectric LCDs by Dijon in Liquid Crystals Applications and Uses, vol 1 Ed. Bahadur, World Scientific Publishing Co. Pte. Ltd. 1990 pp 305–360 and references therein discusses alignment processes for smectic phases for low molar mass materials. The filling of cells is believed to be possible only in the isotropic or nematic phase due to the viscosity of smectic phases. Generally materials with the following phase sequence give good alignment:

$$I \rightarrow N^* \rightarrow S_A \rightarrow S_C^* \text{ or } I \rightarrow S_A \rightarrow S_C^*$$

whereas materials with the following phase sequences are more difficult to align:

$$I \rightarrow N^* \rightarrow S_C^*$$

Typically, therefore, in order to use a liquid crystal material in the smectic phase it will involve heating the material to the nematic or isotropic phase and allowing it to cool slowly into an aligned smectic state. Should this technique be applied to a polymer liquid crystal material then the cooling time is usually very much longer in order to assist the alignment, though very often the alignment is poor.

Materials and Assembling Process of LCDs by Morozumi in Liquid Crystals Applications and Uses. vol 1 Ed. Bahadur, World Scientific Publishing Co. Pte. Ltd. 1990pp 171–194 and references therein as the title suggests discusses methods for assembling liquid crystal devices.

Another method for aligning liquid crystal polymers may be found in UK patent application GB 9420632.3.

Another class of compounds which may be described as liquid crystal polymers are side chain liquid crystal cyclic polysiloxanes. These are described in the following references:

K. D. Gresham et al, J. Pol. Sci., Part A, Polymer chem., 32, 2039, 1994;
I. Sledzinska et al. J. of inorganic and organometallic polymers, 4, 199, 1994;
Kreuzer et al, Mol. Cryst. Liq. Cryst., 199, 345, 1991;
Richards et al, J. chem. Soc. Commun., 2, 95, 1990;
P. Spes et al, German Patent Application DE 3940148;
Kreuzer et al U.S. Pat. No. 4.410.570.

Polysiloxanes may be represented by the following general formula:

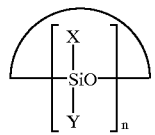

wherein n may range from 3 upwards, though more usually from 4 upwards. The positions of the substituents X and Y relative to each other allow for the existence of isomers. For example suppose that in the above formula n=4:

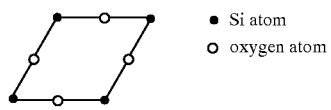

At each silicon one of the X and Y substituents

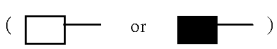

will lie above the plane and the other will lie below the plane of silicons. The following notation may be used.

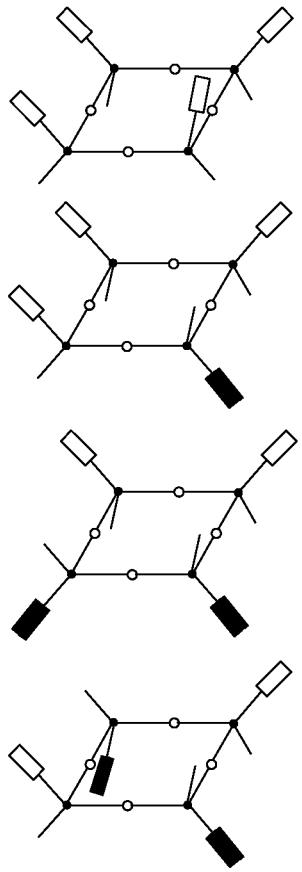

Thus when n=4, there are four possible isomers.

It is known to make polysiloxanes containing mesogenic side chains in either the X or Y positions. It is an object of the present invention to provide side chain liquid crystal cyclic polysiloxanes that exhibit enhanced properties over those already known.

Further it is the inventors' belief that no attempt has been made to synthesise pure isomers of side chain liquid crystal cyclic polysiloxanes. A pure isomer may exhibit different properties when compared with an isomeric mixture comprising that pure isomer.

BRIEF DESCRIPTION OF THE DRAWINGS

FIG. 2 illustrates synthetic scheme 2 for the synthesis of compounds of the invention;

FIG. 3 illustrates synthetic scheme 3 for the synthesis of compounds of the invention;

FIG. 9 illustrates synthetic scheme 9 for the synthesis of compounds of the invention;

DESCRIPTION OF THE INVENTION

Figure 1:
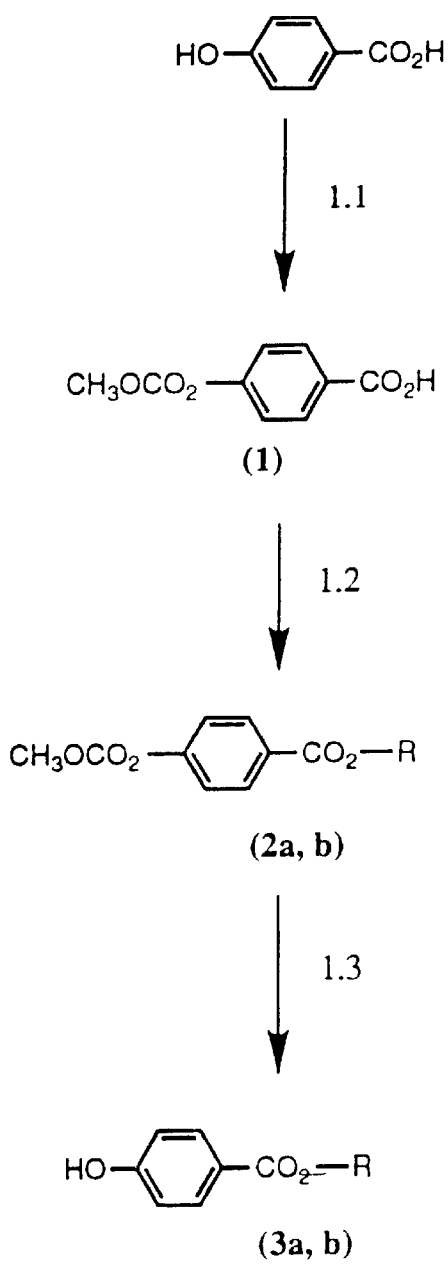
FIG. 1 illustrates a synthetic scheme 1 of the synthesis of compounds of the invention.
Figure 4:
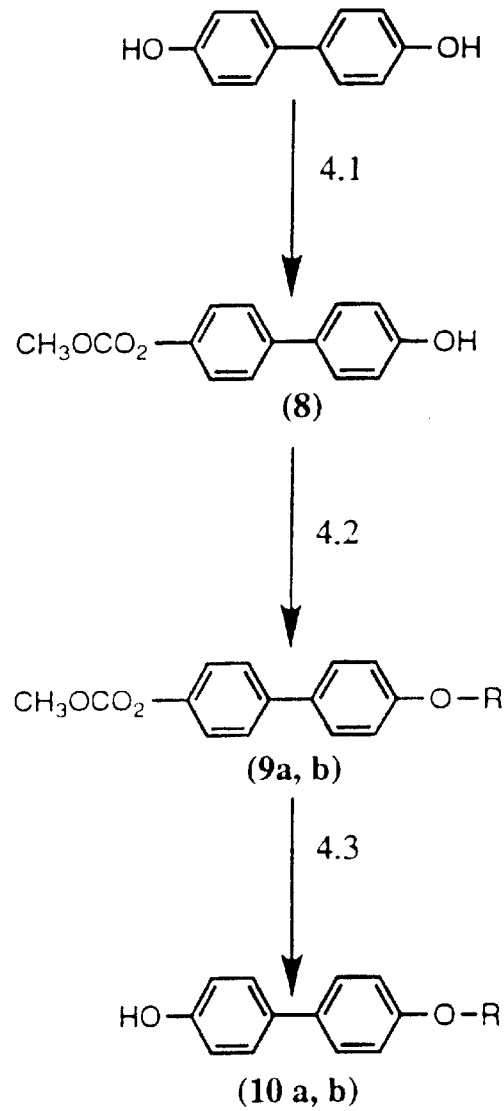
FIG. 4 illustrates synthetic scheme 4 for the synthesis of compounds of the invention.
Figure 5:
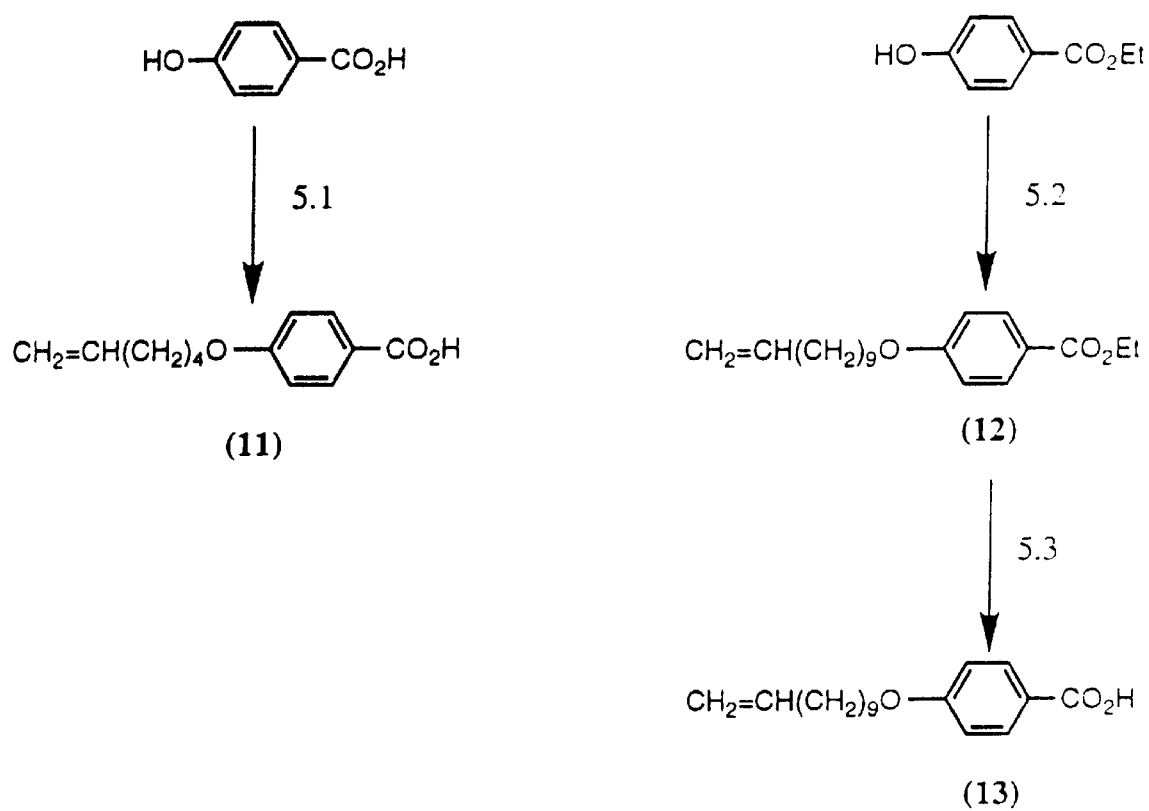
FIG. 5 illustrates synthetic scheme 5 for the synthesis of compounds of the invention.
Figure 6:
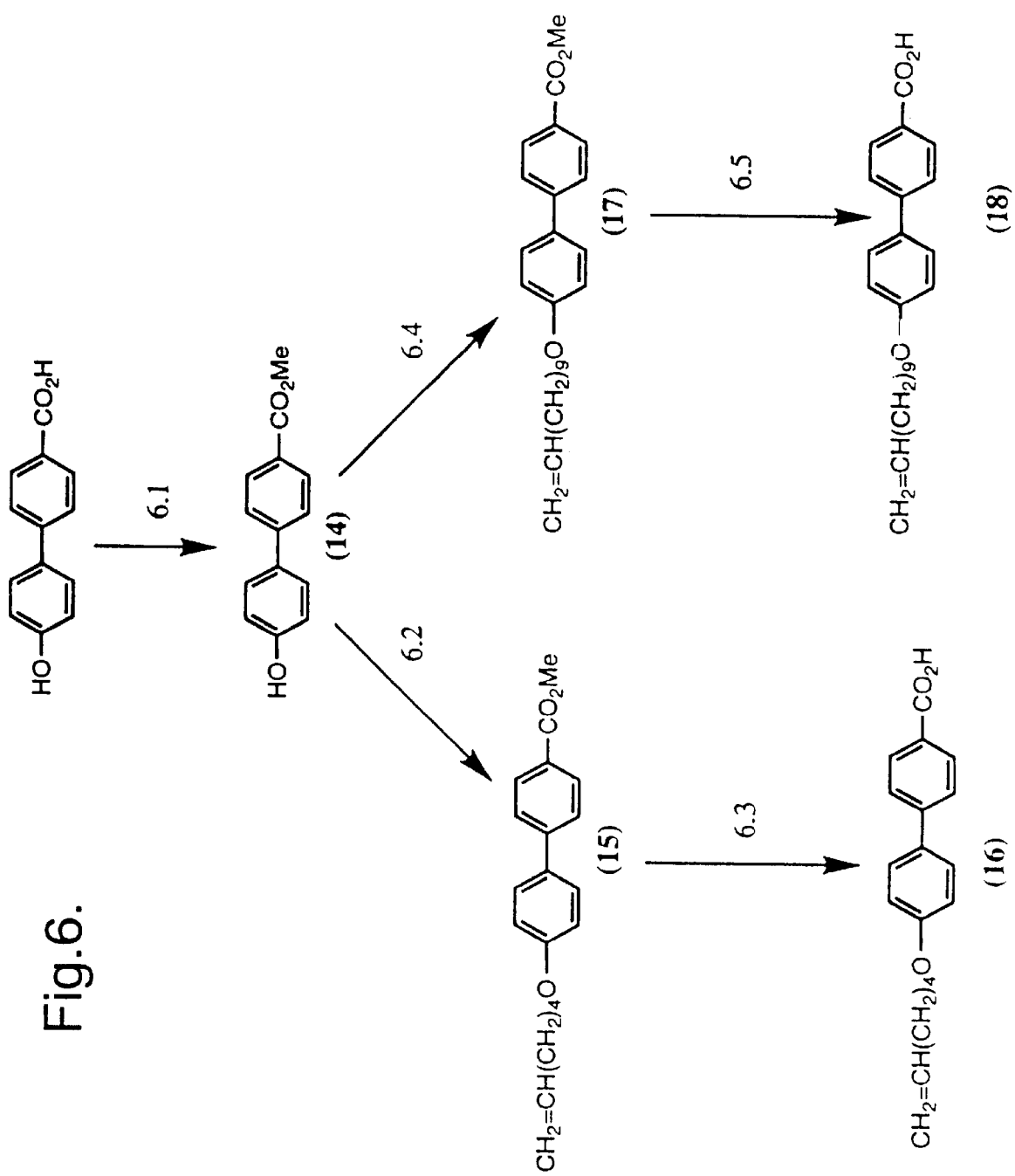
FIG. 6 illustrates synthetic scheme 6 for the synthesis of compounds of the invention.
Figure 7:
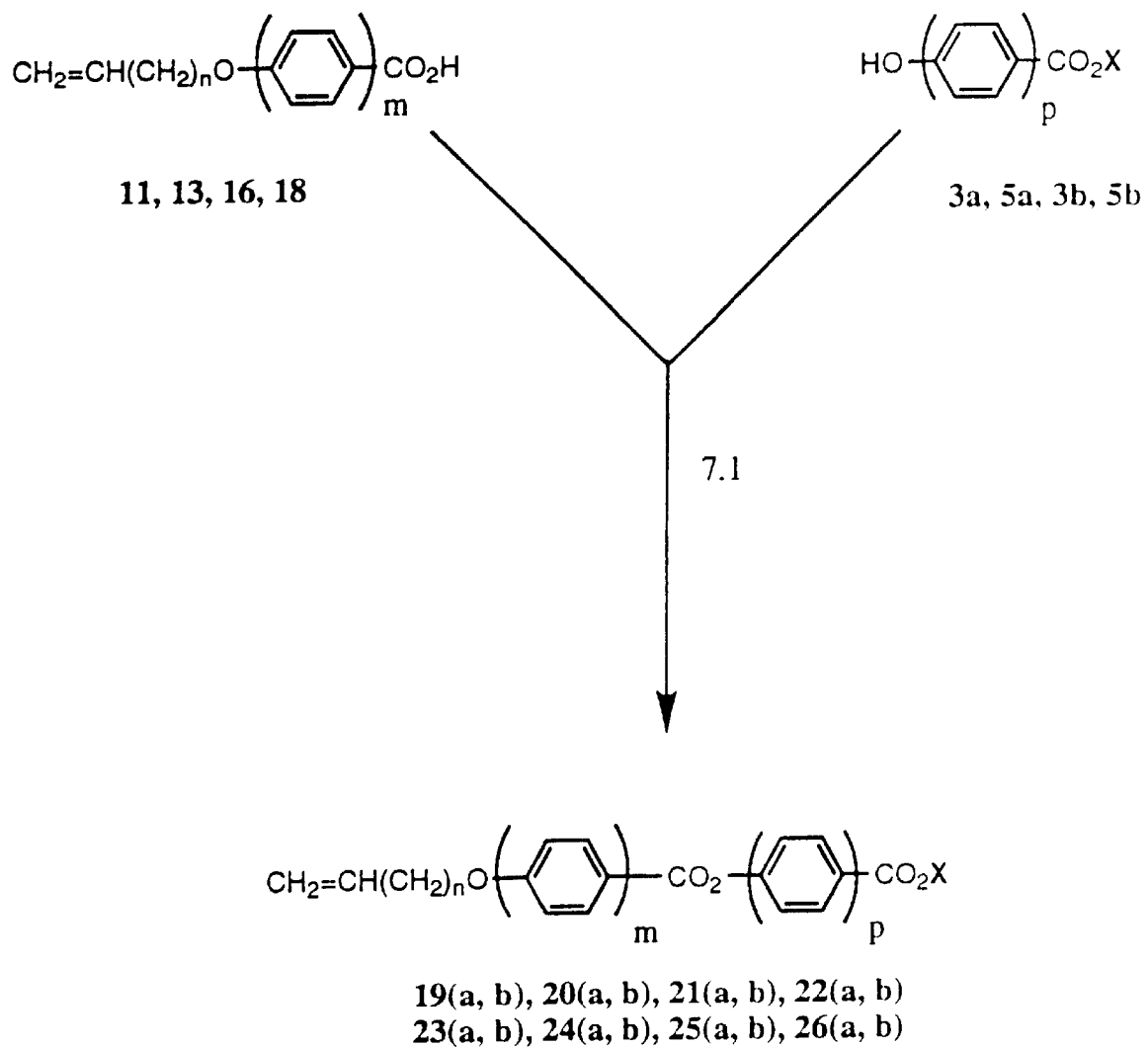
FIG. 7 illustrates synthetic scheme 7 for the synthesis of compounds of the invention.
Figure 8:
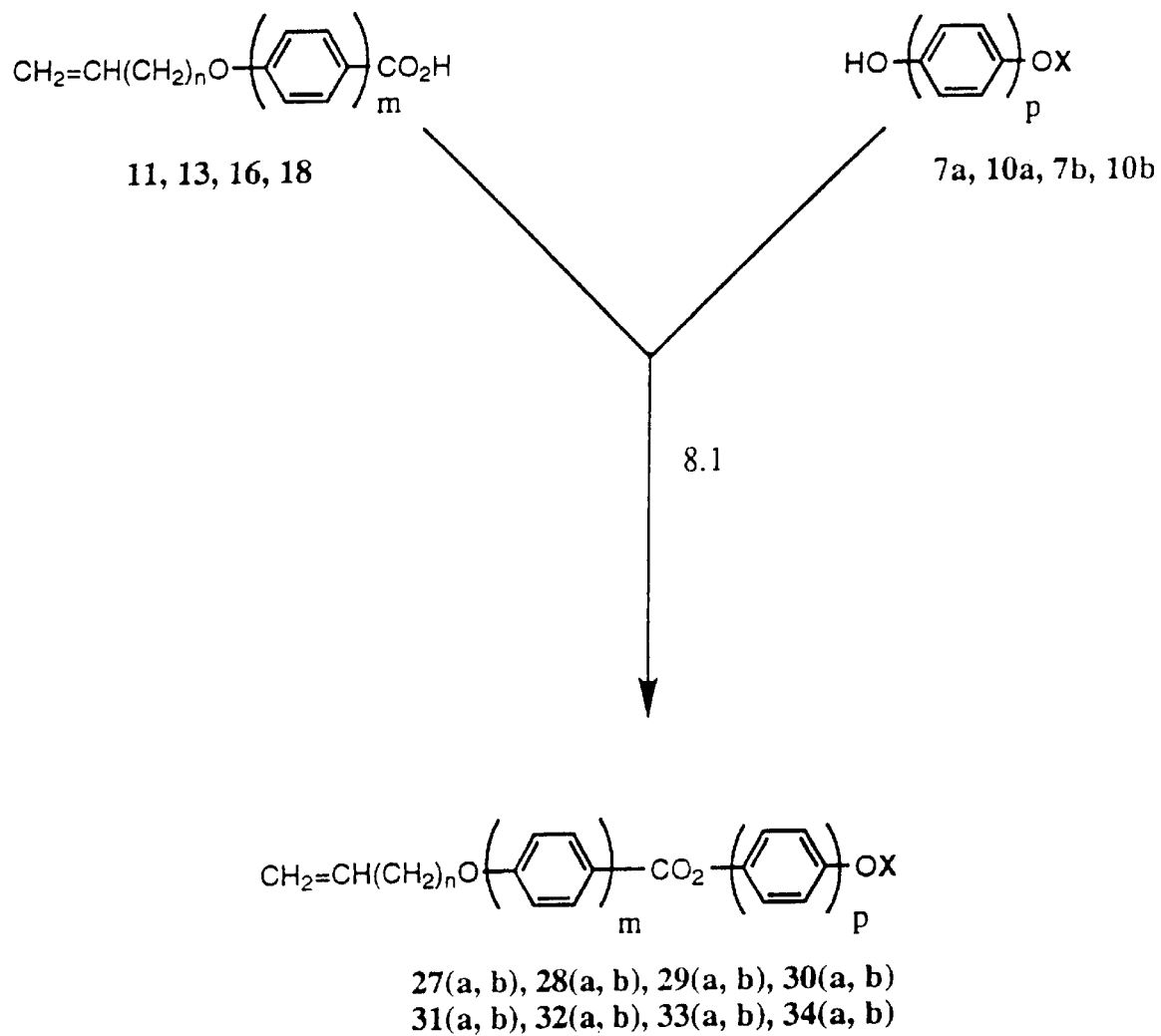
FIG. 8 illustrates synthetic scheme 8 for the synthesis of compounds of the invention.

According to this invention there are provided compounds of general Formula I:

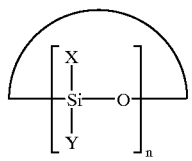

I wherein $n=3-30$; X and Y are independently chosen from $C_{1-6}$ alkyl, phenyl or formula II:

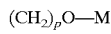    II wherein $p=1-20$ and M is a group of formula III:

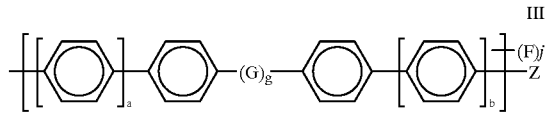

III wherein a, b and g are independently chosen from 0 and 1; G is selected from $CO_2$, OCO and is a single bond when $g=0$; $j=0-4$; F indicates that one or more of the phenyl rings may be laterally fluorinated; Z is chosen from R, OR, $CO_2R$, OCOR, CN, wherein R is selected from $C_{1-20}$ branched or straight chain alkyl and may contain a chiral centre; provided that at least one of X and Y is selected from formula II.

Preferably X or Y is selected from methyl or ethyl; $n=4-16$; $p=1-16$; $j=0$ or 1.

Even more preferably X or Y is methyl; $n=4-10$; $p=1-12$; $j=1$.

According to a further aspect of this invention the compounds of formula I may be present in a pure isomeric form.

The compounds of the present invention may be mixed with each other to form useful liquid crystal mixtures, they may also be mixed with other liquid crystal polymers or low molar mass non-polymer liquid crystal materials. In particular the materials of the present invention may be mixed with linear polysiloxanes.

Suitable devices in which the materials of the present invention may be incorporated, include beam steerers, shutters, modulators, and pyroelectric/piezoelectric sensors.

The materials of the present invention may also be useful as dopants in ferroelectric liquid crystals, which may be multiplexed, or they may be used in active backplane ferroelectric liquid crystal systems. The materials of the present invention may also be useful as host materials. The materials of the present invention may be included in mixtures which also contain one or more of dopants.

Compounds of formula I may be mixed with a wide range of hosts, for example smectic hosts to form a useful liquid crystal composition. Such compositions can have a range of values of spontaneous polarisation (Ps). Compounds of Formula I may be mixed with one or more of the types of hosts VIII–XIII. These different types of hosts may be mixed together to which the compound of general formula I may also be added.

Typical hosts include:

The compounds described in PCT/GB86/00040, eg of formula VIII

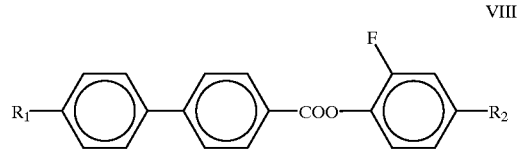

VIII where $R_1$ and $R_2$ are independently $C_3-C_{12}$ alkyl or alkoxy.

The fluoro-terphenyls described in EPA 84304894.3 and GBA 8725928, eg including those of formula IX

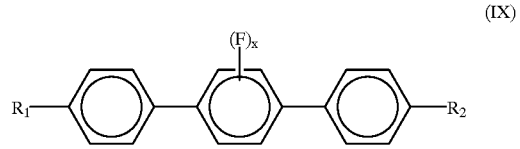

(IX)

where $R_1$ and $R_2$ are independently $C_3-C_{12}$ alkyl or alkoxy, x is 1 and F may be on any of the available substitution positions on the phenyl ring specified.

The difluoro-terphenyls described in GBA 8905422.5, eg of formula X

where $R_1$ and $R_2$ are independently $C_3$–$C_{12}$ alkyl or alkoxy.

The phenyl-pyrimidines described in WO 86/00087, eg of formula XI

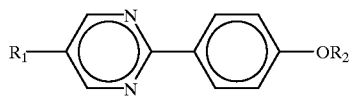

including those compounds where $R_1$ is $C_3$–$C_{12}$ alkyl and $R_2$ is given by the general formula $(CH_2)_n$—$CHXCH_2CH_3$, where n is 1 to 5 and X is CN or Cl.

The compounds described by R. Eidenschink et al. in Cyclohexanederivative mit Getilteneten Smektischen Phasen at the $16^{th}$ Freiberg Liquid Crystal Conference, Freiberg, Germany, p8. Available from E. Merck Ltd., Germany, eg of formula XII.

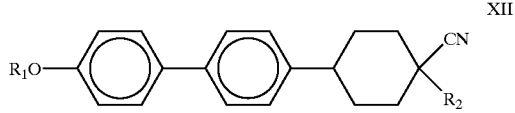

including those compounds where $R_1$ and $R_2$ are independently $C_1$–$C_{15}$ alkyl.

The difluoro-phenyl pyrimidines described in European Patent Application EP 0 332 024 A1, including the following:

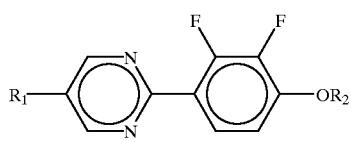

including those compounds where $R_1$ and $R_2$ are independently $C_3$–$C_9$ alkyl.

The materials of the present invention may also be useful in thermochromic devices, for example those devices described by D. G. McDonnell in Thermotropic Liquid Crystals, Critical Reports on Applied Chemistry, Vol. 22, edited by G. W. Gray, 1987 pp 120–44 and references therein.

The invention will now be described by way of example only with reference to the accompanying drawings of which:

FIGS. 1–9 illustrate synthetic schemes for the synthesis of compounds.

Figure 10:
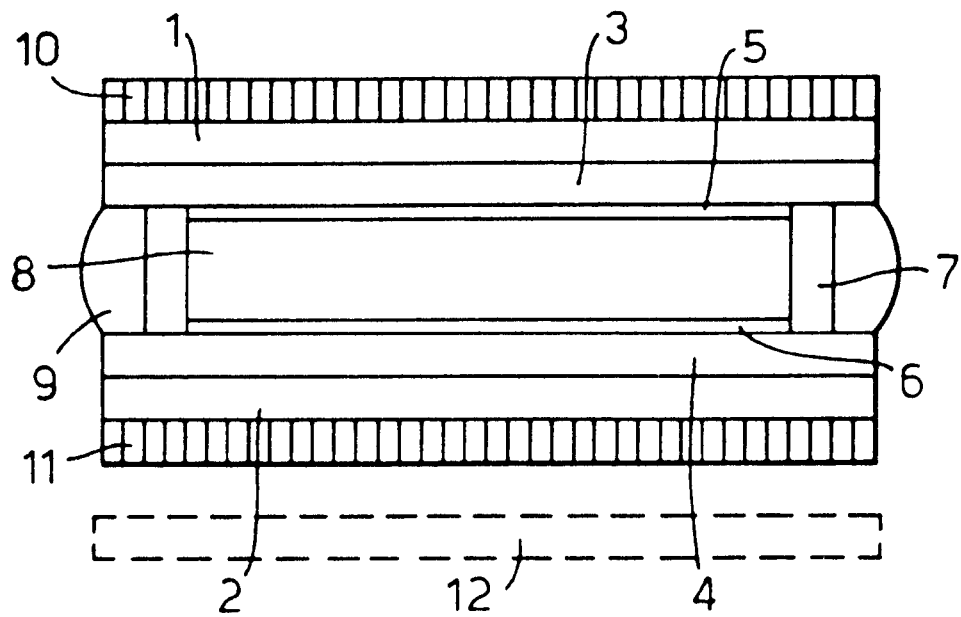
FIG. 10 illustrates a liquid crystal device in which the materials of the invention may be included.

FIG. 10 illustrates a liquid crystal device in which the materials of the current invention may be included.

Figure 11:
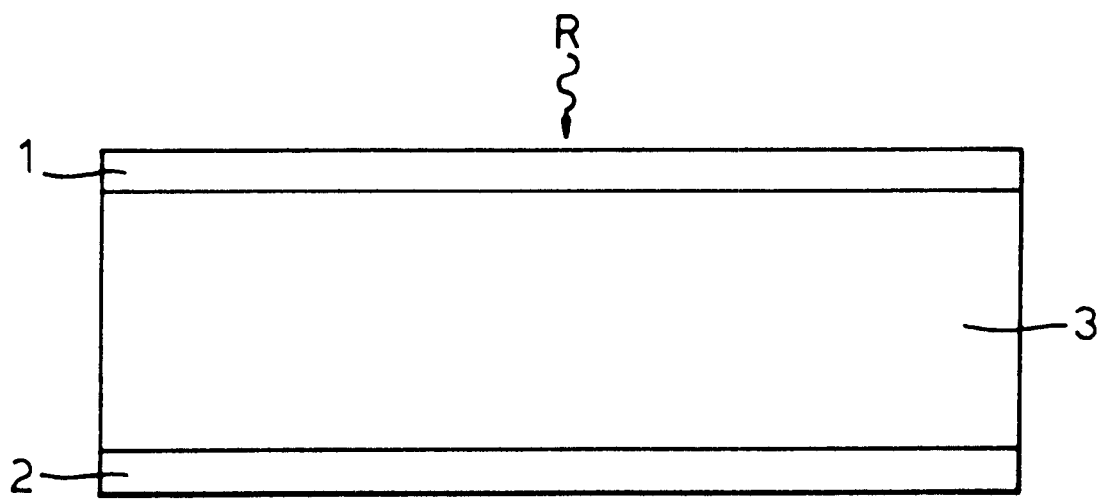
FIG. 11 illustrates a pyroelectric device in which the materials of the invention may be included.

FIG. 11 illustrates a pyroelectric device in which the materials of the current invention may be included.

Figure 12:
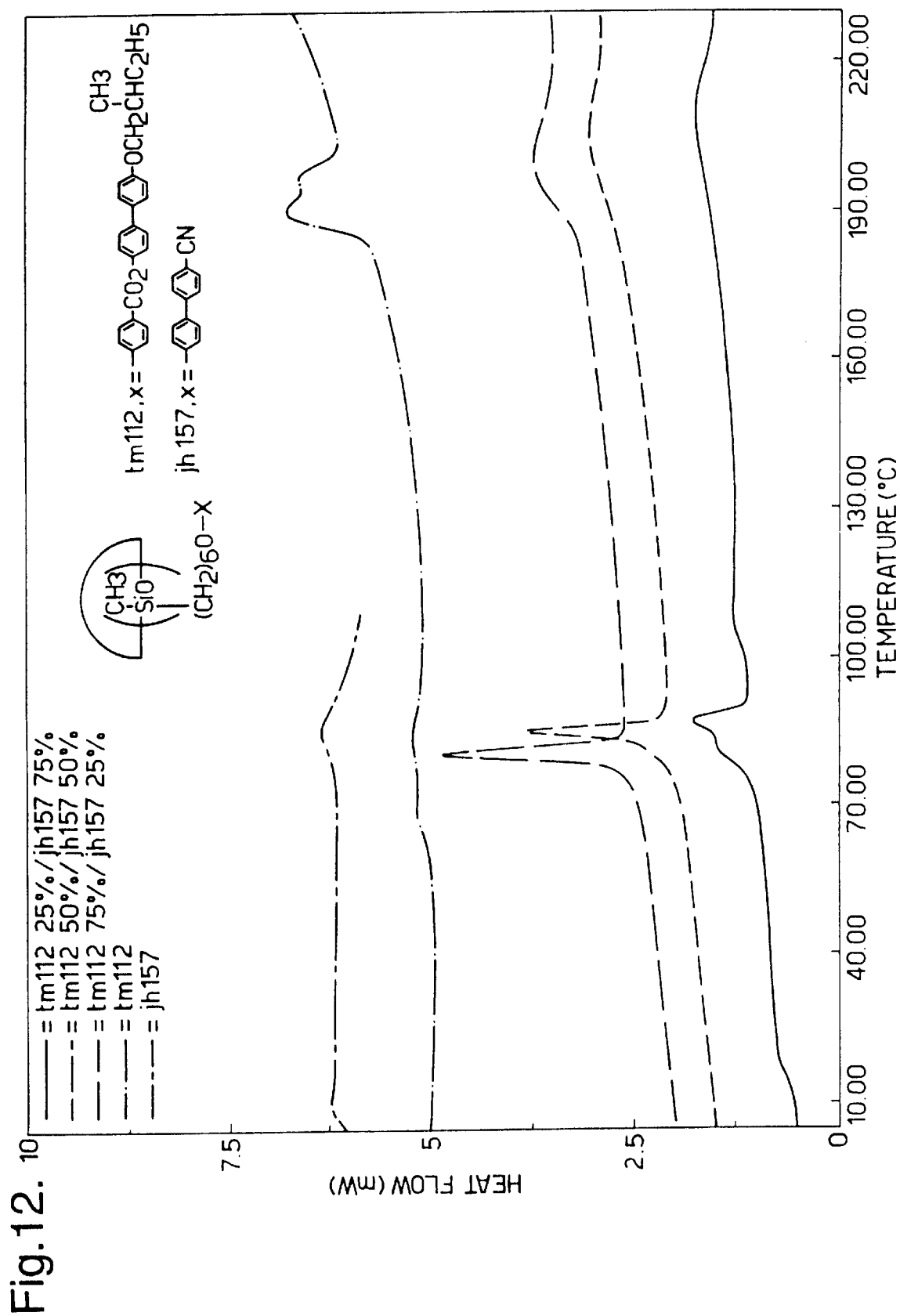
FIG. 12 illustrates a DSC plot of mixtures which include compounds of the invention.

FIG. 12 illustrates a DSC plot of mixtures which include compounds described by the current invention.

Figure 13:
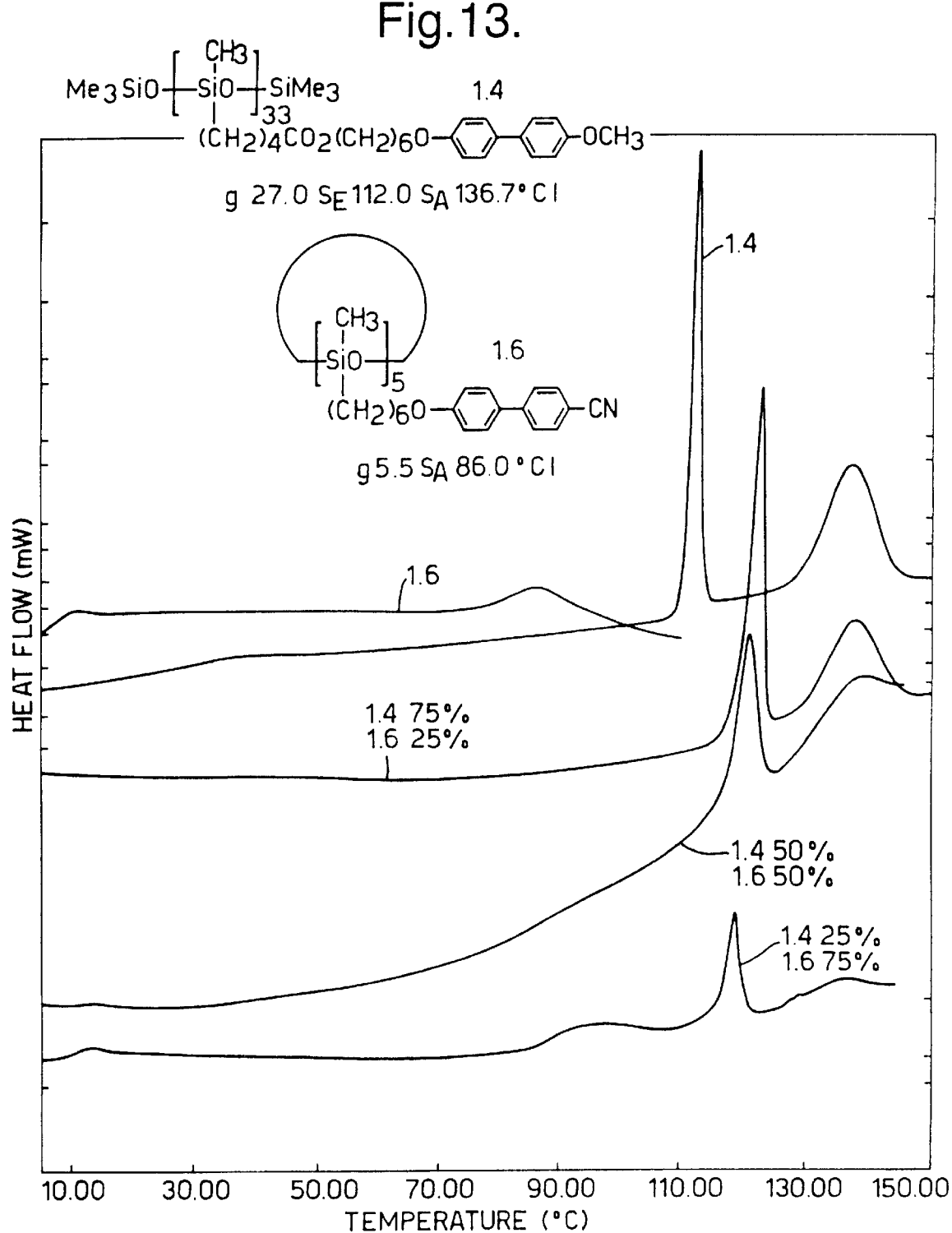
FIG. 13 illustrates a DSC plot of mixtures which include compounds of the invention.

FIG. 13 illustrates a DSC plot of mixtures which include compounds described by the current invention.

Reagents used in the synthetic routes of FIGS. 1 to 9 are shown below in corresponding schemes 1 to 9.

Scheme 1

1.1 Methylchloroformate, Sodium Hydroxide, Ethanol, Water 1.2 S(−)-2-Methyl-1-butanol, DEAD, Triphenylphosphine, THF 1.3 Ethanol, Ammonia Scheme 2

2.1 Glacial Acetic Acid/Water, Concentrated Sulphuric Acid 2.2 S(−)-2-Methyl-1-butanol or R(−)-2-octanol, DEAD, Triphenyl Phosphine, THF Scheme 3

3.1 S(−)-2-Methyl-1-butanol or R(−)-2-octanol, DEAD, Triphenyl Phosphine, THF 3.2 Sodium Metal, 1-butanol Scheme 4

4.1 Methylchloroformate, Sodium Hydroxide, Ethanol, Water 4.2 S(−)-2-Methyl-1-butanol or R(−)-2-octanol, DEAD, Triphenylphosphine, THF 4.3 Ethanol, Ammonia Scheme 5

5.1 6-Bromohex-1-ene, Sodium Hydroxide/Water, Ethanol 5.2 10-Undecen-1-ol, DEAD, Triphenyl Phosphine, THF 5.3 Sodium Hydroxide/Water, Ethanol Scheme 6

6.1 Methanol, Concentrated Sulphuric Acid 6.2 6-Bromohex-1-ene, Potassium Carbonate, Butanone, Potassium Iodide 6.3 Sodium Hydroxide/Water, Ethanol 6.4 10-Undecen-1-ol, DEAD, Triphenyl Phosphine, THF 6.5 Similar to Step 6.3

Scheme 7

7.1 DCC, DMAP, Dichloromethane

Scheme 8

8.1 DCC, DMAP, Dichloromethane

Scheme 9

9.1 Hexachloroplatinic Acid, Toluene, Appropriate Terminal Alkene

Abbreviations for schemes.

DEAD: diethylazodicarboxylate. THF: tetrahydrofuran, DCC: dicyclohexylcarbodiimide. DMAP: N,N-dimethylaminopyridine.

Unless otherwise stated starting materials were obtained from Aldrich Chemical Company Ltd. Gillingham, Dorset. Chiral alcohols were purchased from Fluka chemicals Ltd.

Gillingham, Dorset. Cyclic polymer backbones from Fluorochem Ltd, Old Glossop, Derbyshire. 4'-cyano-4-hydroxybiphenyl was purchased from Merck Ltd, Poole, Dorset.

The following are a selection of compounds that have been made according to the current invention.

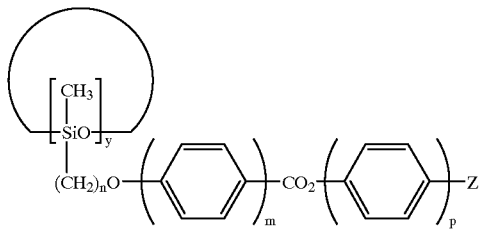

Series 1: y = 4, Z= —CO$_2$CH$_2$$\overset{*}{\text{C}}$H(CH$_3$)C$_2$H$_5$, n = 6 or 11, m = 1 or 2, p = 1 or 2

Series 2: y = 4, Z= —CO$_2$$\overset{*}{\text{C}}$H(CH$_3$)C$_6$H$_{13}$, n = 6 or 11, m = 1 or 2, p = 1 or 2

Series 3: y = 4, Z= —OCH$_2$$\overset{*}{\text{C}}$H(CH$_3$)C$_2$H$_5$, n = 6 or 11, m = 1 or 2, p = 1 or 2

Series 4: y = 4, Z= —O$\overset{*}{\text{C}}$H(CH$_3$)C$_6$H$_{13}$, n = 6 or 11, m = 1 or 2, p = 1 or 2

Series 5: y = 5, Z= —CO$_2$CH$_2$$\overset{*}{\text{C}}$H(CH$_3$)C$_2$H$_5$, n = 6 or 11, m = 1 or 2, p = 1 or 2

Series 6: y = 5, Z= —CO$_2$$\overset{*}{\text{C}}$H(CH$_3$)C$_6$H$_{13}$, n = 6 or 11, m = 1 or 2, p = 1 or 2

Series 7: y = 5, Z= —OCH$_2$$\overset{*}{\text{C}}$H(CH$_3$)C$_2$H$_5$, n = 6 or 11, m = 1 or 2, p = 1 or 2

Series 8: y = 5, Z= —O$\overset{*}{\text{C}}$H(CH$_3$)C$_6$H$_{13}$, n = 6 or 11, m = 1 or 2, p = 1 or 2

In Tables 1–3 the following notations are used: ✓ indicates those compounds synthesised, 2MB = —CH$_2$$\overset{*}{\text{C}}$H(CH$_3$)C$_2$H$_5$, 2Oct = —CH$_2$$\overset{*}{\text{C}}$H(CH$_3$)C$_6$H$_{13}$.

The following Table 1 gives details of compound number, for ease of reference, and structure for scheme 7.

TABLE 1

| Compound No. | n | m | p | -CO$_2$2MB | -CO$_2$2Oct |
|---|---|---|---|---|---|
| 19a | 4 | 1 | 1 | ✓ | |
| 19b | 4 | 1 | 1 | | ✓ |
| 20a | 4 | 2 | 1 | ✓ | |
| 20b | 4 | 2 | 1 | | ✓ |
| 21a | 4 | 1 | 2 | ✓ | |
| 21b | 4 | 1 | 2 | | ✓ |
| 22a | 4 | 2 | 2 | ✓ | |
| 22b | 4 | 2 | 2 | | ✓ |
| 23a | 9 | 1 | 1 | ✓ | |
| 23b | 9 | 1 | 1 | | ✓ |
| 24a | 9 | 2 | 1 | ✓ | |
| 24b | 9 | 2 | 1 | | ✓ |
| 25a | 9 | 1 | 2 | ✓ | |
| 25b | 9 | 1 | 2 | | ✓ |

TABLE 1-continued

| Compound No. | n | m | p | -CO$_2$2MB | -CO$_2$2Oct |
|---|---|---|---|---|---|
| 26a | 9 | 2 | 2 | ✓ | |
| 26b | 9 | 2 | 2 | | ✓ |

The following Table 2 gives details of compound number, for ease of reference, and structure for scheme 8.

TABLE 2

| Compound No. | n | m | p | -O2MB | -O2Oct |
|---|---|---|---|---|---|
| 27a | 4 | 1 | 1 | ✓ | |
| 27b | 4 | 1 | 1 | | ✓ |
| 28a | 4 | 2 | 1 | ✓ | |
| 28b | 4 | 2 | 1 | | ✓ |
| 29a | 4 | 1 | 2 | ✓ | |
| 29b | 4 | 1 | 2 | | ✓ |
| 30a | 2 | 2 | 2 | ✓ | |
| 30b | 4 | 2 | 2 | | ✓ |
| 31a | 9 | 1 | 1 | ✓ | |
| 31b | 9 | 1 | 1 | | ✓ |
| 32a | 9 | 2 | 1 | ✓ | |
| 32b | 9 | 2 | 1 | | ✓ |
| 33a | 9 | 1 | 2 | ✓ | |
| 33b | 9 | 1 | 2 | | ✓ |
| 34a | 9 | 2 | 2 | ✓ | |
| 34b | 9 | 2 | 2 | | ✓ |

The following Table 3 gives details of compound number, for ease of reference, and structure for scheme 9.

TABLE 3

| Compound No | y | n | m | p | End group |
|---|---|---|---|---|---|
| 35 | 4 | 6 | 1 | 1 | CO$_2$2MB |
| 36 | 4 | 6 | 2 | 1 | CO$_2$2MB |
| 37 | 4 | 6 | 1 | 2 | CO$_2$2MB |
| 38 | 4 | 6 | 2 | 2 | CO$_2$2MB |
| 39 | 4 | 11 | 1 | 1 | CO$_2$2MB |
| 40 | 4 | 11 | 2 | 1 | CO$_2$2MB |
| 41 | 4 | 11 | 1 | 2 | CO$_2$2MB |
| 42 | 4 | 11 | 2 | 2 | CO$_2$2MB |
| 43 | 4 | 6 | 1 | 1 | CO$_2$2Oct |
| 44 | 4 | 6 | 2 | 1 | CO$_2$2Oct |
| 45 | 4 | 6 | 1 | 2 | CO$_2$2Oct |
| 46 | 4 | 6 | 2 | 2 | CO$_2$2Oct |
| 47 | 4 | 11 | 1 | 1 | CO$_2$2Oct |
| 48 | 4 | 11 | 2 | 1 | CO$_2$2Oct |
| 49 | 4 | 11 | 1 | 2 | CO$_2$2Oct |
| 50 | 4 | 11 | 2 | 2 | CO$_2$2Oct |
| 51 | 4 | 6 | 1 | 1 | O2MB |
| 52 | 4 | 6 | 2 | 1 | O2MB |
| 53 | 4 | 6 | 1 | 2 | O2MB |
| 54 | 4 | 6 | 2 | 2 | O2MB |
| 55 | 4 | 11 | 1 | 1 | O2MB |
| 56 | 4 | 11 | 2 | 1 | O2MB |
| 57 | 4 | 11 | 1 | 2 | O2MB |
| 58 | 4 | 11 | 2 | 2 | O2MB |
| 59 | 4 | 6 | 1 | 1 | O2Oct |
| 60 | 4 | 6 | 2 | 1 | O2Oct |
| 61 | 4 | 6 | 1 | 2 | O2Oct |
| 62 | 4 | 6 | 2 | 2 | O2Oct |
| 63 | 4 | 11 | 1 | 1 | O2Oct |
| 64 | 4 | 11 | 2 | 1 | O2Oct |
| 65 | 4 | 11 | 1 | 2 | O2Oct |
| 66 | 4 | 11 | 2 | 2 | O2Oct |
| 67 | 5 | 6 | 1 | 1 | CO$_2$2MB |
| 68 | 5 | 6 | 2 | 1 | CO$_2$2MB |
| 69 | 5 | 6 | 1 | 2 | CO$_2$2MB |
| 70 | 5 | 6 | 2 | 2 | CO$_2$2MB |
| 71 | 5 | 11 | 1 | 1 | CO$_2$2MB |
| 72 | 5 | 11 | 2 | 1 | CO$_2$2MB |
| 73 | 5 | 11 | 1 | 2 | CO$_2$2MB |

TABLE 3-continued

| Compound No | y | n | m | p | End group |
|---|---|---|---|---|---|
| 74 | 5 | 11 | 2 | 2 | $CO_2$2MB |
| 75 | 5 | 6 | 1 | 1 | $CO_2$2Oct |
| 76 | 5 | 6 | 2 | 1 | $CO_2$2Oct |
| 77 | 5 | 6 | 1 | 2 | $CO_2$2Oct |
| 78 | 5 | 6 | 2 | 2 | $CO_2$2Oct |
| 79 | 5 | 11 | 1 | 1 | $CO_2$2Oct |
| 80 | 5 | 11 | 2 | 1 | $CO_2$2Oct |
| 81 | 5 | 11 | 1 | 2 | $CO_2$2Oct |
| 82 | 5 | 11 | 2 | 2 | $CO_2$2Oct |
| 83 | 5 | 6 | 1 | 1 | O2MB |
| 84 | 5 | 6 | 2 | 1 | O2MB |
| 85 | 5 | 6 | 1 | 2 | O2MB |
| 86 | 5 | 6 | 2 | 2 | O2MB |
| 87 | 5 | 11 | 1 | 1 | O2MB |
| 88 | 5 | 11 | 2 | 1 | O2MB |
| 89 | 5 | 11 | 1 | 2 | O2MB |
| 90 | 5 | 11 | 2 | 2 | O2MB |
| 91 | 5 | 6 | 1 | 1 | O2Oct |
| 92 | 5 | 6 | 2 | 1 | O2Oct |
| 93 | 5 | 6 | 1 | 2 | O2Oct |
| 94 | 5 | 6 | 2 | 2 | O2Oct |
| 95 | 5 | 11 | 1 | 1 | O2Oct |
| 96 | 5 | 11 | 2 | 1 | O2Oct |
| 97 | 5 | 11 | 1 | 2 | O2Oct |
| 98 | 5 | 11 | 2 | 2 | O2Oct |

The following compound was separated into its constituent isomers 1–4.

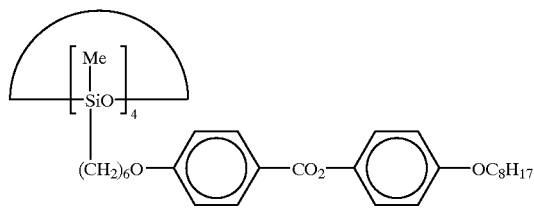

K 78.4° C. $S_c$ 103.6° C. I

Isomers 1 and 2 correspond to the isomers wherein 2 substituents are pointing up and two are pointing down; the difference between isomers 1 and 2 is that one of them possesses substituents pointing in the same direction adjacent to each other and the other possesses substituents pointing in the same direction diagonally opposed to each other. Isomers 1 and 2 are present in amounts of 12.7% and 28.5%. Isomer 3 corresponds to the case where 3 of the substituents are pointing in the same direction and the fourth is pointing in the opposite direction, this is present in 53.0%. Isomer 4 is where all the substituents are pointing in the same direction, this isomer is present in 5.8%.

The separation of the four isomers of the cyclic polysiloxane was carried out using a Merck/Hitachi preparative HPLC which consisted of the following:
1. L-6200A intelligent pump
2. L-4000 UV detector, set at 254 nm
3. D-6000 interface
4. T-6300 column thermostat
5. Data handling system
6. Dupont Zorbac ODS column (21.2 mm×25cm)

The impurities from the isomer mixture were removed using the following conditions.
a. Gradient preparative HPLC
b. Mobile phase was a mixture of 50/50 chloroform/acetonitrile for 5 minutes, then gradient elution up to a mobile phase mixture of 40/60 chloroform/acetonitrile.
c. multiple injections of 1 cm³ of a solution containing 0.1 g of isomer mixture in 5 cm³ of 40/60 chloroform/acetonitrile.

Isomer 4 was separated from the isomer mixture using the following conditions.
a. Isocratic preparative HPLC.
b. Mobile phase was a mixture of 40/60 chloroform/acetonitrile.
c. Multiple injections of 1 cm³ of a solution containing 2 g of isomer mixture in 10 cm³ of 40/60 chloroform/acetonitrile.

Isomers 1,2 and 3 were separated from the isomer mixture using the following conditions.
a. Isocratic preparative HPLC
b. Mobile phase was a mixture of 39/61 chloroform/acetonitrile.
c. Multiple injections of 1 cm³ of a solution containing 0.01 g of isomer mixture in 5 cm³ of 39/61 chloroform/acetonitrile
d. Column oven set at 30° C.

The transition temperatures of the four pure isomers are given below.
Isomer 1: K $S_C$100.9° C. I
Isomer 2: K 80.3 $S_C$97.7° C. I
Isomer 3: K 65.7 $S_C$101.3° C. I
Isomer 4: K 60.0 $S_1$ 102.5 $S_C$116.1° C. I As previously mentioned the compounds of formula I may be mixed with one another and with a variety of linear side chain liquid crystal polysiloxanes. FIG. 13 illustrates that they may be mixed with linear SCLC polysiloxanes up to a concentration of approximately 50%. Higher concentrations may be achievable by careful selection of the relevant structures.

The compounds described by the current invention are useful for a broad range of applications.

Many of the compounds described by Formula I and mixtures including compounds of Formula I show liquid crystalline behaviour and are thus usefully employed in liquid crystal devices. Examples of such devices include optical and electro-optical devices, magneto-optical devices. and devices providing responses to stimuli such as temperature changes and total or partial pressure changes. The compounds of formula I may also be included in a mixture, where the mixture comprises at least two compounds. Typical mixtures include mixtures consisting of compounds of Formula I, and also mixtures comprising at least one compound of Formula I and at least one compound not of Formula I.

An example of the use of a compound of general Formula I in a device embodying the present invention will now be described with reference to FIG. 10.

The liquid crystal device consists of two transparent plates, 1 and 2, in this case made from glass. These plates are coated on their internal face with transparent conducting electrodes 3 and 4. An alignment layer 5,6 is introduced onto the internal faces of the cell so that a planar orientation of the molecules making up the liquid crystalline material will be approximately parallel or at a small angle to the glass plates 1 and 2. For some types of display the alignment directions are orthogonal. The electrodes 3, 4 may be formed into row and column electrodes so that the intersections between each column and row form an x, y matrix of addressable elements or pixels. A spacer 7 eg of polymethyl methacrylate separates the glass plates 1 and 2 to a suitable distance eg 2 microns. Liquid crystal material 8 is introduced between glass plates 1, 2 by filling the space in between them. The spacer 7 is sealed with an adhesive 9 in a vacuum using an existing technique. Polarisers 10, 11 are arranged in front of and behind the cell. For some devices, only one or even no polarisers are required.

In alternative embodiments the substrates with the aligning layers on them are heated and sheared to induce alignment, alternatively the substrates with the aligning layers are thermally annealed above the glass transition temperature and below the liquid crystal to isotropic phase transition in combination with an applied field. Further embodiments may involve a combination of these aligning techniques. With some of these combinations an alignment layer may not be necessary.

The device may operate in a transmissive or reflective mode. In the former, light passing through the device, eg from a tungsten bulb, is selectively transmitted or blocked to form the desired display. In the reflective mode a mirror (12) is placed behind the second polariser 11 to reflect ambient light back through the cell and two polarisers. By making the mirror partly reflecting the device may be operated both in a transmissive and reflective mode.

The alignment layers 5,6 have two functions, one to align contacting liquid crystals molecules in a preferred direction and the other to give a tilt to these molecules—a so called surface tilt—of a few degrees typically around 4° or 5°. The alignment layers 5, 6 may be formed by placing a few drops of the polyimide onto the cell wall and spinning the wall until a uniform thickness is obtained. The polyimide is then cured by heating to a predetermined temperature for a predetermined time followed by unidirectional rubbing with a roller coated with a nylon cloth.

In an alternative embodiment a dye material may be incorporated with the material of the device and a single polariser used.

Materials have been proposed for laser addressed applications in which laser beams are used to scan across the surface of the material or leave a written impression thereon. For various reasons, many of these materials have consisted of organic materials which are at least partially transparent in the visible region. The technique relies upon localised absorption of laser energy which causes localised heating and in turn alters the optical properties of the otherwise transparent material in the region of contact with the laser beam. Thus as the beam traverses the material, a written impression of its path is left behind. One of the most important of these applications is in laser addressed optical storage devices, and in laser addressed protection displays in which light is directed through a cell containing the material and is projected onto a screen. Such devices have been described by Khan Appl. Phys. Lett. Vol. 22, p 111, 1973; and by Harold and Steele in Proceedings of Euro display 84, pages 29–31, September 1984, Paris, France, in which the material in the device was a smectic liquid crystal material. Devices which use a liquid crystal material as the optical storage medium are an important class of such devices. The use of semiconductor lasers, especially $Ga_xAl_{1-x}As$ lasers where x is from 0 to 1, and is preferably 1, has proven popular in the above applications because they can provide laser energy at a range of wavelengths in the near infra-red which cannot be seen and thus cannot interfere with the visual display, and yet can provide a useful source of well-defined, intense heat energy. Gallium arsenide lasers provide laser light at wavelengths of about 850 nm, and are useful for the above applications. With increasing Al content (x<1), the laser wavelength may be reduced down to about 750 nm. The storage density can be increased by using a laser of shorter wavelength.

The compounds of the present invention may be suitable as optical storage media and may be combined with dyes for use in laser addressed systems, for example in optical recording media.

The smectic and/or nematic properties of the materials described by the current invention may be exploited.

For example the materials of the current invention may be used to produce ferroelectric mixtures and devices.

The compounds of the present invention may also be used in pyroelectric devices for example detectors, steering arrays and vidicon cameras.

FIG. 11 illustrates a simple pyroelectric detector in which the materials of the current invention may be incorporated:

A pyroelectric detector consists of electrode plates 1,2 at least one of which may be pixellated. In operation the detector is exposed to radiation R, for example infrared radiation, which is absorbed by the electrode 1. This results in a rise in temperature which is transmitted to a layer of pyroelectric material 3 by conduction. The change in temperature results in a thermal expansion and a charge is generated. This change in charge is usually small when compared with the charge ouput due to the change in the spontaneous polarisation, Ps with a change in temperature; this constitutes the primary pyroelectric effect. A change in charge results in a change in potential difference between the electrodes. The charge on each pixel may be read out and the resulting signal is used to modulate scanning circuits in, for example, a video monitor and for a visual image of the infrared scans.

The selective reflective properties of the materials described by the current invention may also allow for materials of the current invention to be used in inks and paints and they may therefore be useful in anti-counterfeiting operation. They also be used in so-called security inks. Other applications may include thermal control management, for example the materials may be included in a coating which may be applied to one or more windows in order to reflect infra-red radiation.

| Compound number | Mesophases exhibited by the Compound |
| --- | --- |
| 35 | g −30.7° $S_C^*$ 47.7° Cl |
| 36 | K 8.7° $S_C^*$ 198.9° $S_A$ 213.0° Cl |
| 37 | K 17.9° $S_C^*$ 192.4° $S_A$ 201.9° Cl |
| 38 | $K_1$ 55.3° $K_2$ 100.5° $S_C^*$ 307.5° $S_A$ 312.5° Cl |
| 39 | g −20.8° $S_C^*$ 50.5° Cl |
| 40 | $K_1$ 27.3° $K_2$ 44.0° $S_C^*$ 183.2° Cl |
| 41 | K 5.5° $S_C^*$ 207.8° Cl |
| 42 | K 97.5° $S_C^*$ 275.0° $S_A$ 280.0° Cl |
| 43 | g −16.7° −6.79° Cl |
| 44 | K 6.25° $S_C^*$ 107.9° $S_A$ 144.5° Cl |
| 45 | K 16.6° $S_C^*$ 117.4° Cl |
| 46 | $K_1$ 116.3° $K_2$ 120.8° $S_C^*$ 268.5° Cl |
| 47 | K −18.6° $S_C^*$ 37.8° Cl |
| 49 | K 25.0° $S_C^*$ 71.0 $S_A$ 124.4° Cl |
| 52 | K 96.2° $S_C^*$ 157.3° Cl |
| 53 | K 74.0° $S_C^*$ 189.8 N* 198.6° Cl |
| 60 | K 32.9° $S_C^*$ 140.6° Cl |
| 61 | K 31.7° $S_C^*$ 114.9° Cl |
| 63 | g −18.3° $S_C^*$ 42.9 $S_A$ 47.2° Cl |
| 65 | $K_1$ 31.85° $K_2$ 45.4° $S_C^*$ 125.5° Cl |
| 66 | $K_1$ 94.6° $K_2$ 124.70 $S_C^*$ 202.2° $S_A$ 125.0° N* 229.1° Cl |
| 67 | g −35.1° $S_C^*$ 37.5° Cl |
| 68 | g 4.2° $S_C^*$ 180.0° $S_A$ 202.8° Cl |
| 69 | g 13.4° $S_C^*$ 192.2° $S_A$ 197.8° Cl |
| 70 | K 77.6° $S_C^*$ 289.5° $S_A$ 298.4° Cl |
| 71 | g −22.1° $S_C^*$ 50.6° Cl |
| 72 | $K_1$ 31.3° $K_2$ 47.7° $S_C^*$ 183.6° Cl |
| 73 | K 4.8° $S_C^*$ 211.1° Cl |
| 74 | $K_1$ 66.8° $K_2$ 100.1° $S_C^*$ 283.1° $S_A$ 286.5° Cl |
| 75 | g −11.9° 1.0° Cl |
| 76 | K 4.2° $S_C^*$ 100.2° $S_A$ 140.4° Cl |
| 77 | K 8.5° $S_C^*$ 109.1° Cl |
| 78 | K 77.8° $S_C^*$ 244.8° Cl |

-continued

| Compound number | Mesophases exhibited by the Compound |
|---|---|
| 79 | K 19.2° $S_C^*$ 39.9° Cl |
| 81 | g 43.4° $S_C^*$ 88.0 $S_A$ 142.5° Cl |
| 84 | K 92.2° $S_C^*$ 181.8° Cl |
| 85 | K 65.0° $S_C^*$ 187.4 N* 195.2° Cl |
| 92 | K 31.3° $S_C^*$ 146.9° Cl |
| 93 | K 33.6° $S_C^*$ 123.1° Cl |
| 95 | g −23.7° $S_C^*$ 39.1 $S_A$ 45.5° Cl |
| 97 | $K_1$ 30.9° $K_2$ 47.3° $S_C^*$ 126.9° Cl |
| 98 | $K_1$ 99.9° $K_2$ 119.3° $S_C^*$ 206.6 $S_A$ 222.5° N* 227.3° Cl |

We claim:

1. A compound of formula I

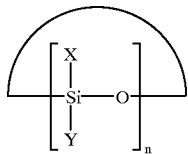

I wherein n=3–30; X and Y are independently chosen from $C_{1-6}$ alkyl, phenyl or formula II:

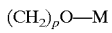   II (CH$_2$)$_p$O—M wherein p=1–20 and M is a group of formula III:

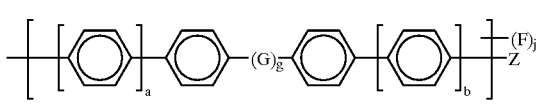

III wherein a, b and g are independently chosen from 0 and 1; G is selected from $CO_2$, OCO and is a single bond when g=0; j=0–4; F indicates that one or more of the phenyl rings may be laterally fluorinated; Z is chosen from R, OR, $CO_2R$, OCOR or CN wherein R is selected from chiral $C_{4-20}$ branched chain alkyl, provided that at least one of X and Y is selected from formula II and that the positions of X and Y relative to each other provide stereo-isomers.

2. A compound according to claim 1 wherein X or Y is selected from methyl or ethyl, n=4–16; p=1–16; j=0 or 1.

3. A compound according to claim 2 wherein X or Y is methyl.

4. A liquid crystal mixture comprising at least one of the compounds of claim 1.

5. A ferroelectric liquid crystal mixture comprising at least one of the compounds of claim 1.

6. A cholesteric liquid crystal mixture comprising at least one of the compounds of claim 1.

7. A liquid crystal mixture containing any of the compounds of claim 1 and a host material of the following general formula:

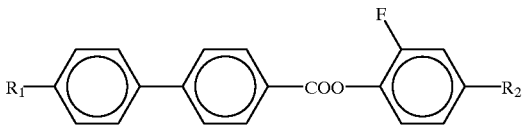

where $R_1$ and $R_2$ are independently $C_3$–$C_{12}$ alkyl or alkoxy.

8. A liquid crystal mixture containing any of the compounds of claim 1 and a host material of the following general formula

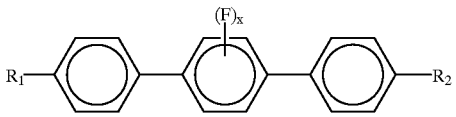

where $R_1$ and $R_2$ are independently $C_3$–$C_{12}$ alkyl or alkoxy, x is 1 and F may be on any one of the available substitution positions on the phenyl ring specified.

9. A liquid crystal mixture containing any of the compounds of claim 1 and a host material of the following general formula:

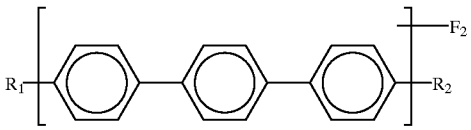

where $R_1$ and $R_2$ are independently $C_3$–$C_{12}$ alkyl or alkoxy.

10. A liquid crystal mixture containing any of the compounds of claim 1 and a host material of the following general formula:

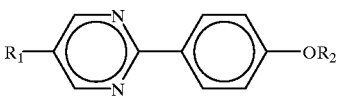

where $R_1$ is $C_3$–$C_{12}$ alkyl and R is given by the general formula $(CH_2)_n$—$CHXCH_2CH_3$, where n is 1 to 5 and X is CN or Cl.

11. A liquid crystal mixture containing any of the compounds of claim 1 and a host material of the following general formula

where $R_1$ and $R_2$ are independently $C_1$–$C_{15}$ alkyl or alkoxy.

12. A liquid crystal mixture containing any of the compounds of claim 1 and a host material of the following general formula

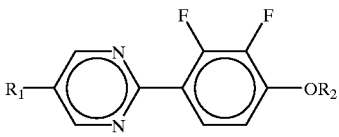

where $R_1$ and $R_2$ are independently $C_3$–$C_9$ alkyl or alkoxy.

13. A liquid crystal mixture containing any of the compounds of claim 1 and a linear side chain liquid crystal polysiloxane.

14. A liquid crystal electro-optical display device wherein it incorporates a mixture as claimed in claim 4.

15. A device comprising two spaced cell walls each bearing electrode structures and treated on at least one facing surface with an alignment layer, a layer of a liquid crystal material enclosed between the cell walls, wherein it incorporates the liquid crystal mixture as claimed in claim 4.

16. A pyroelectric device comprising two spaced electrodes and a layer of a liquid crystal material enclosed between the electrodes, wherein it incorporates the liquid crystal mixture as claimed in claim 4.

17. An optical recording medium comprising a recording layer which comprises one or more compounds of claim 1 and a dye material.

* * * * *